United States Patent [19]

Asberg

[11] 3,757,883
[45] Sept. 11, 1973

[54] WHEEL SUPPORT FOR AN ENGINE PROPELLED ROAD VEHICLE

[75] Inventor: Sture Lennart Asberg, Savedalen, Sweden

[73] Assignee: SKF Industriele-En Ontwikkeling-Maatschappij N.V., Amsterdam, Netherlands

[22] Filed: Feb. 3, 1971

[21] Appl. No.: 112,287

[52] U.S. Cl............. 180/70 R, 188/18 A, 280/96.1, 308/191
[51] Int. Cl............................................. B62d 7/06
[58] Field of Search........................ 280/96.1, 96.3; 301/5 R, 5.7; 188/18 R, 18 A; 308/191; 180/70 R

[56] References Cited
UNITED STATES PATENTS

| | | | |
|---|---|---|---|
| 3,295,626 | 1/1967 | Cadiou............................ | 280/96.3 X |
| 3,552,813 | 1/1971 | Brescia............................. | 308/191 |
| 3,295,636 | 1/1967 | Adams.............................. | 188/18 R |
| 1,982,377 | 11/1934 | Duby................................ | 280/96.3 |
| 2,370,097 | 2/1945 | Weiss................................ | 280/96.1 |
| 1,062,472 | 5/1913 | Kaye................................. | 280/96.3 |
| 3,103,387 | 9/1963 | Saxenberg......................... | 301/5.7 |
| 1,975,661 | 10/1934 | Powell............................. | 301/5.7 X |

Primary Examiner—Kenneth H. Betts
Assistant Examiner—John P. Silverstrim
Attorney—Howson and Howson

[57] ABSTRACT

A preassembled wheel support unit having inner and outer annular members with confronting raceways for relative rotation and means for connecting one annular member to the vehicle and the other annular member to the wheel and brake disk. The pitch diameter of the raceways is at least twice the overall axial width of the annular members whereby forces resulting from functioning of the brake are acting at substantially the same diameter and close to forces from the wheel and reaction forces from the vehicle. A drive coupling member is connected to the inner annular member.

6 Claims, 7 Drawing Figures

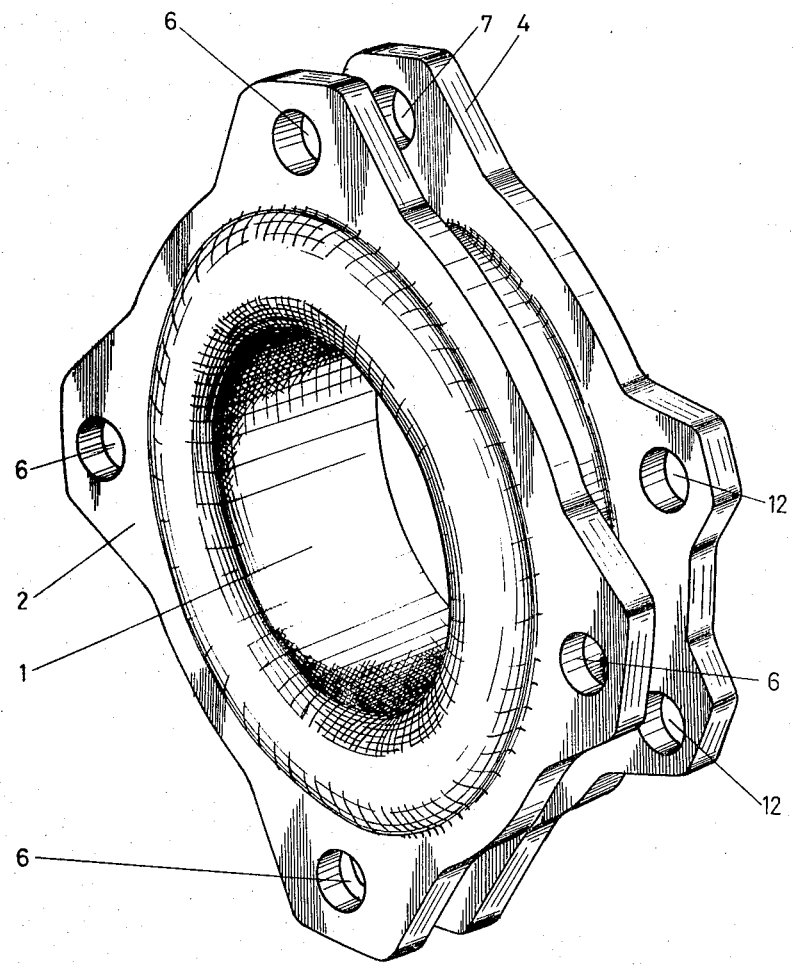

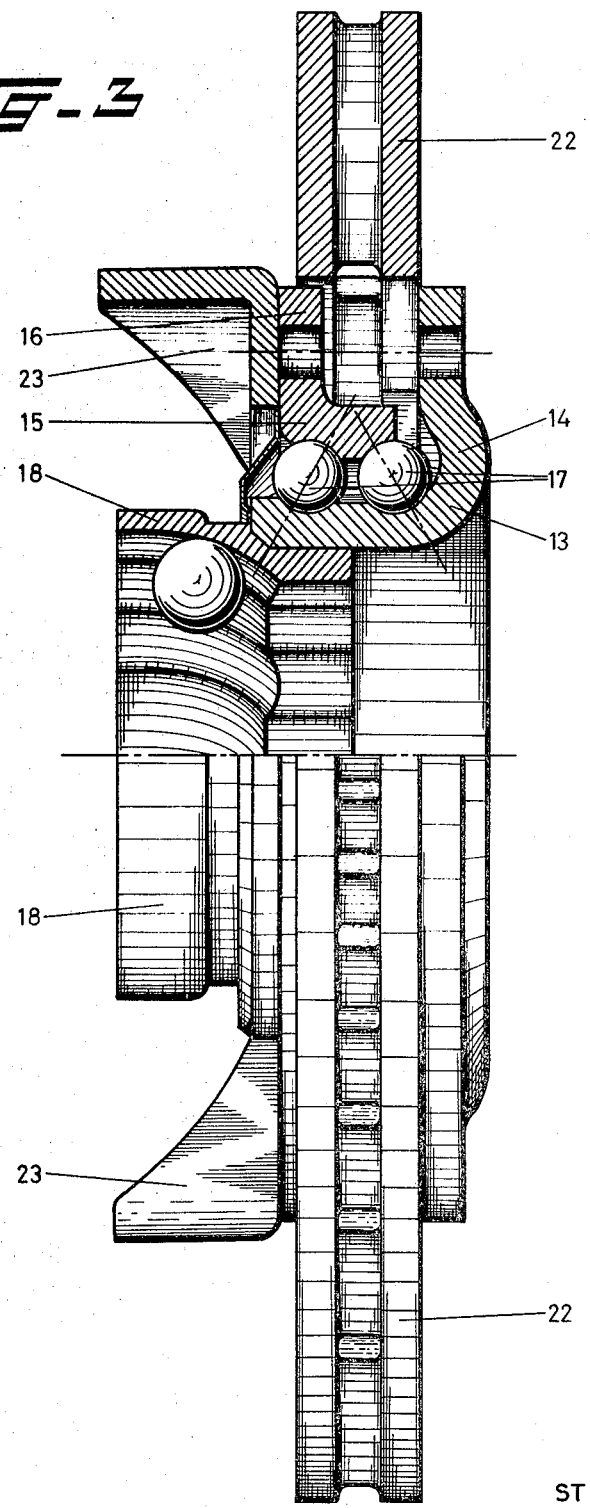

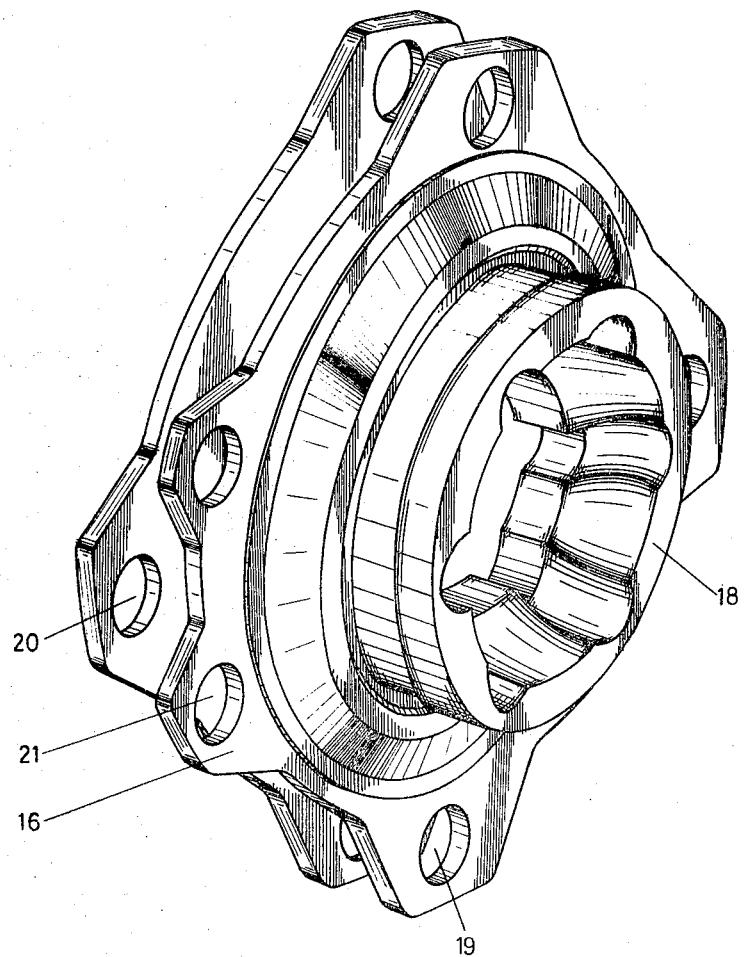

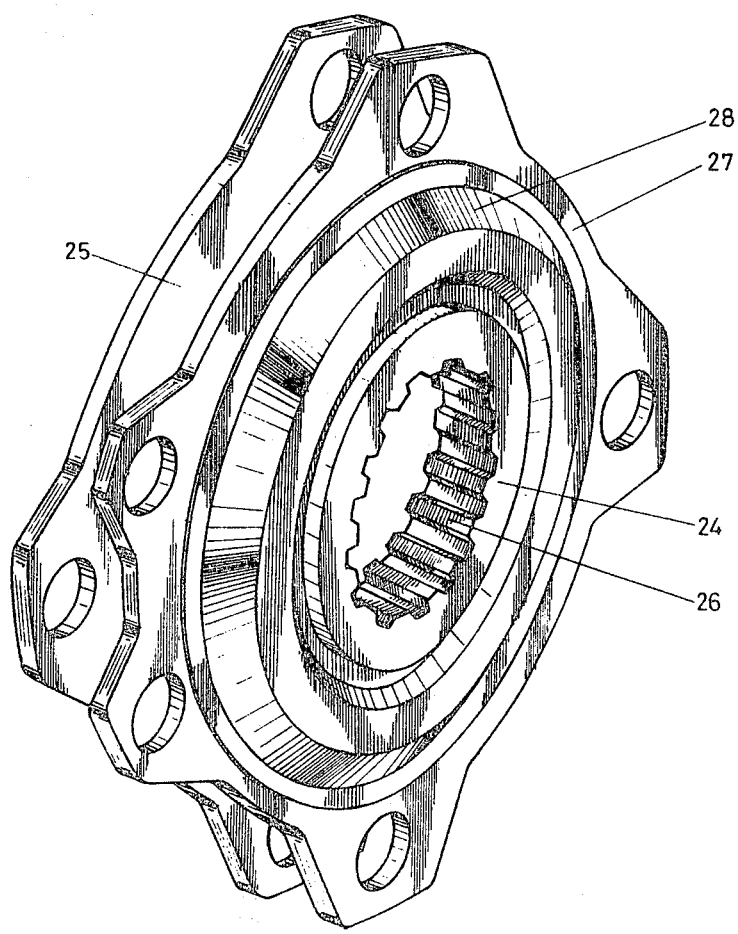

INVENTOR:
STURE LENNART ÅSBERG

WHEEL SUPPORT FOR AN ENGINE PROPELLED ROAD VEHICLE

The present invention relates to an engine propelled road vehicle having a wheel support comprising an axial radial bearing unit formed by two concentric structural members, each provided with races and with integral connecting means for connecting the unit to the wheel on one hand and to the vehicle on the other hand. From the published older Dutch patent applications 68.05108 and 68.05109 it is already known to use a wheel bearing unit for the support of a wheel of an engine propelled road vehicle. According to said older proposals a unit has been provided which is cheap and simply to manufacture and which does away the problems existing with the traditional wheel supports having a normal ball or roller bearing with inner and outer race ring and accurately machined seats and the accumulation of tolerances inherent with said construction. Such a unit is connected to the vehicle by means of a few bolts and the wheel and disc brake are also connected to it by means of a few bolts.

Although said older proposals relate to an extremely important new development in the design of wheel supports for motor cars and the like, further developments are possible and the present invention intends, by making use of the features of the unit of the prior proposals to simplify standardization if desired to such an extent that all car types and all wheels independent of the question whether they are driven or non-driven, steerable or non-steerable, independently suspended or not, can make use of one and the same wheel support; with only one type to manufacture the costs of manufacturing will be reduced to an extremely small level.

According to the invention this has been achieved in that all wheels of the vehicle are supported by a bearing unit which in principle for all wheels has the same inner and outer structural members with in principle the same integral connecting means, the driven wheels having in addition a coupling secured to the inner rotatable structural member of the unit. The words "in principle" do mean that slight differences between, e.g., front and rear wheels are permissible. This means that all inner structural members of all wheels of the car are the same; the same holds true for all outer structural members. The connecting means are the same, which means same diameter and same spacing at the inner structural member and the same holds true for the outer structural member, although diameter and spacing need not to be necessarily the same as for the inner structural member. Important, however, is that in principle the same values for the dimensions are present at all the wheel supports for all the wheels.

At the driven wheels an additional member has been attached to the inner rotatable structural member of the unit. Such an additional part is necessary to transmit the driving torque to the wheels.

If all wheel supports or units of all wheels of one car are the same they will be the same for all cars of the same type and they can be the same for all cars of the same size or even a number of sizes. For instance all passenger cars whether light or medium could make use of one single type of wheel unit, but if required two or three different sizes of the wheel unit would still form an enormous standardization of all passenger cars from light to heavy.

It will be clear that the additional coupling to be secured to the inner rotatable member for the driven wheels forms a part which has to be machined properly. With extremely large series it does not influence the price whether such a coupling is present or not and this opens the possibility that according to the invention the vehicle may have at all wheels the same unit. This means that the non-dirven wheels are also provided with a coupling, which coupling is not used, need not to be machined to its final finish, but nevertheless is present and can be present because as rotating inner member for the non-driven wheel it does not in any way disturb the functioning of the non-driven wheel.

It is of course well known that there exists normalization with respect to normal ball and roller bearings, having inner and outer race rings. Such bearings are located on seats of a shaft and within a housing and it is normal to calculate which type of bearing has to be used and to adapt the rest of the construction to other parts of the vehicle.

According to the invention the standardization of the unit opens the way to cheap repair operations, requiring no skill at all, but in particular is in favour of production and store holding.

According to the invention the wheel bearing unit intended to be used in the vehicle can be characterized in that said unit comprises two concentric members with integral race surfaces for rolling bearing elements, located between said members, each member having a series of holes for connecting the member to the wheel and rotating brake part on one hand and to the vehicle and stationary brake part on the other hand, the holes for the stationary brake part being circumferentially spaced from the holes connecting the unit to the vehicle. This means that the unit is formed of two annular members having integral race surfaces, balls or rollers between said annular members and holes in said annular members for the functions of connecting the unit to the vehicle, connecting the wheel to it and connecting the rotating and stationary parts of the brake to it.

According to one preferred embodiment said structural members may be annular members of L-shaped cross section, having holes in both flanges at the same diameter and spacing. In that case, taking into account that the function of the bearing is bi-axial and radial it does not matter how the unit is attached. This may be seen as an advantage but also as a disadvantage since it then is possible to mount the unit for the non-driven wheel in such a way that not the inner member but the outer is the rotating member. To avoid this it is preferred that the flange of the stationary member has additional holes for the attachment of the stationary brake part. Then no mistakes can be made whilst manufacturing remains simple.

For a bi-axial radial bearing all sorts of rolling elements can be used. In its simplest form one row of balls can be used, each ball having two point contact in each race.

For the unit according to the invention it is of great importance to use a large pitch diameter for the bearing such as a diameter which is larger than the axial length of the unit. The rigidity which can be achieved with large pitch diameter of the bearing allows the use of all kinds of material for the structural members such as pressed sheet metal, light metal, pressed metal powder and re-inforced synthetic resin. In those cases where no steel is used for the structural members it will be necessary to use race parts of steel, positioned in the material of the structural members.

The invention now will be further elucidated with reference to the drawings.

FIG. 2 shows the embodiment of FIG. 1 in perspective.

FIG. 3 shows the construction for a steerable wheel, partly in cross section.

FIG. 4 shows the embodiment of FIG. 3 in perspective.

FIG. 5 is the same perspective view as FIG. 4 of a slightly different embodiment.

Figure 6:
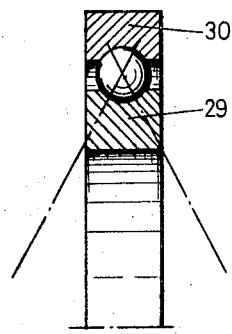
FIG. 6 shows a different but very simple solution.

FIG. 7a, b and c show different forms of the inner and outer parts of the embodiment of FIG. 6.

Figure 1:
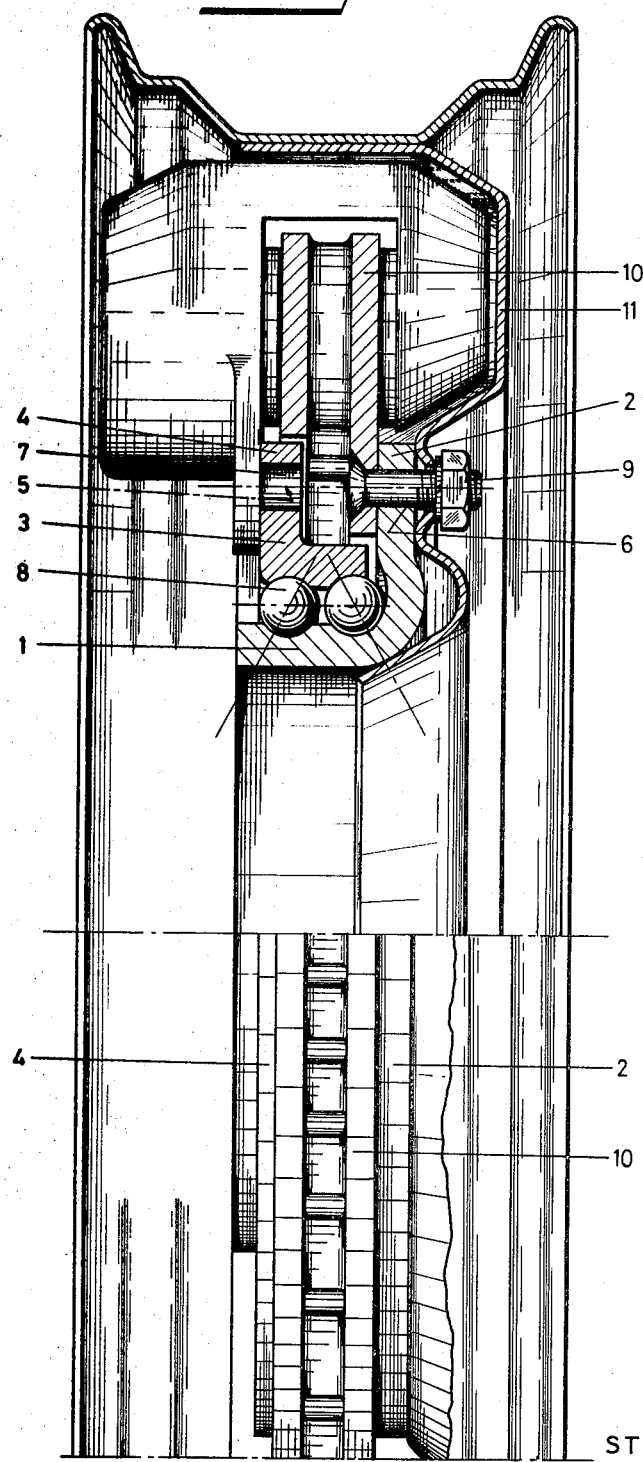
FIG. 1 shows in cross section an embodiment of the wheel support unit to be used in a vehicle according to the invention.

The wheel support unit of FIGS. 1 and 2 comprises an inner member 1, with a radial flange 2 and an outer member 3 with flange 4. Said flanges are provided with bolt holes 6 and 7 at a common pitch diameter 5.

The members 1 and 3 are L-shaped in cross section and between the concentric parts a double row bi-axial radial ball bearing 8 has been provided, cooperating with races which are integral with the material of the members 1 and 3 respectively.

By means of the bolts 9 a brake disc 10 and a wheel 11 are secured to the flange 2 of member 1. Flange 4 of member 3 can be secured in a manner not shown in FIG. 1 by means of bolts in holes 7 to wheel carrying arms or similar members of the vehicle and the calliper housing of the brake can be attached to similar holes 12, shown only in FIG. 2.

FIG. 2 clearly shows that the holes 12 cannot be used for securing a wheel to the flange 4 and that only a calliper housing can be attached to it.

FIGS. 3 and 4 relate to a driven embodiment, comprising an inner member 13 with flange 14 and an outer member 15 with flange 16. Between the two members 13 and 15 a double row ball bearing 17 has been provided.

In the inner member 13 the outer part of a homokinetic drive coupling has been secured, for instance by means of welding.

The openings for the bolts are indicated at 19 and 20 respectively. For the calliper housing bores 21 are provided on flange 16.

The brake disc 22 can be secured to the flange 14 and flange 16 can be secured to an annular member 23 with ball joints for the connection with suspension arms.

If one compares FIGS. 2 and 4 with each other it is clear that the only principal difference is formed by the coupling member 18 and it is further clear that if the unit according to FIG. 4 would be used for a non-driven wheel this would be possible without any more.

FIG. 5 shows an embodiment of the same type as shown in FIG. 4 with the onlt difference that instead of the coupling member 18 of FIG. 4 a different coupling member 24 has been secured to the inner rotating member 25 fitting upon a splint shaft end, to which end it has been provided with inner teeth and grooves 26. 27 is the stationary member whilst 28 is the sealing.

Figure 7:
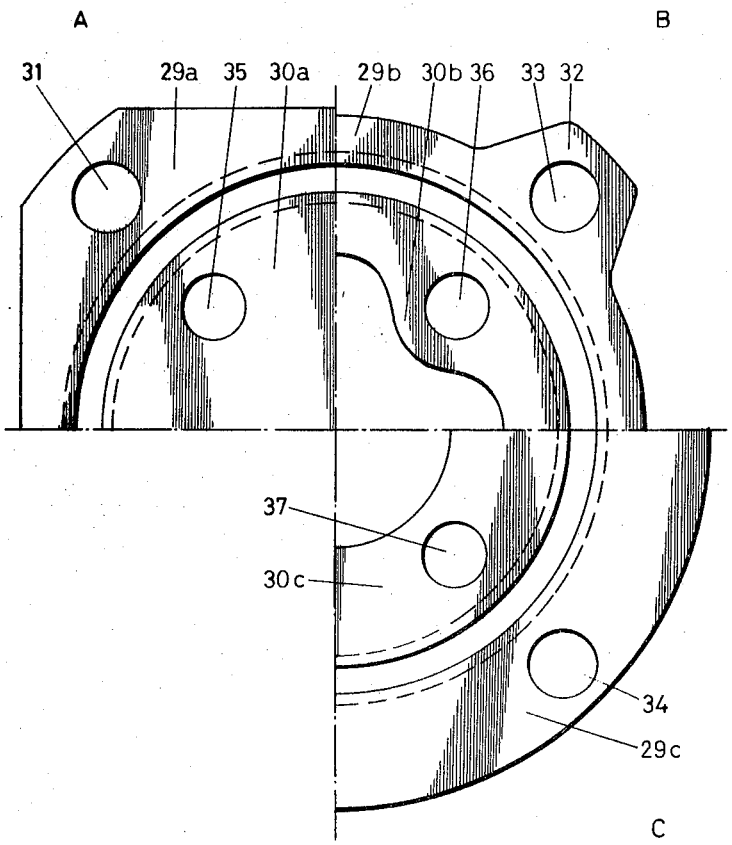

FIGS. 6 and 7 show a simple embodiment made from parts punched out of a piece of sheet metal, the inner part 29 and the outer part 30 then being provided with races, for instance for one row of balls.

As appears from FIG. 7 these inner and outer parts 29 and 30 are formed in such a way that they may contain bolt holes which have to attach these parts. FIG. 7a shows an outer part 29a, which is essentially square in side elevation with bolt holes 31 at the corners.

FIG. 7b shows an embodiment with four diametrically opposed ears 32 with a bolt hole 33 in each of them. In the embodiment of FIG. 7c the outer part has been given such radial dimensions that bolt holes 34 are provided in the annular member 29c.

As far as the inner part is concerned FIG. 7a shows a closed inner part 30a with bolt holes 35, FIG. 7b shows an open inner part with inwardly directed ears 30b with bolt holes 36 and FIG. 7c shows an annular inner part 30c with bolt holes 37.

The inner and outer parts may be punched out of one piece of metal, the race surfaces being machined therein later-on.

What we claim is:

1. A preassembled support for a disc-braked wheel of an engine propelled road vehicle comprising inner and outer annular members relatively rotatable about a central axis, said annular member having confronting raceways, a plurality of rolling elements in the annular space between said raceways, each of said members having a radially directed flange, first connecting means on the flange of one of said members for detachably connecting the same to the vehicle, second connecting means on the flange of said other member for connecting the wheel and brake disc, and a coupling member connected to said other annular member, the pitch diameter of the pitch circle of said rolling elements being at least twice the overall axial width of said annular members, said connecting means being spaced closely to the pitch circle of the rolling element whereby forces resulting from functioning of the brake are acting at substantially the same diameter and close to forces from the wheel and reaction forces from the vehicle.

2. A preassembled support as claimed in claim 1 for a driven wheel of an engine propelled road vehicle.

3. A preassembled support as claimed in claim 1 wherein said coupling member is formed integrally with said other annular member.

4. A preassembled support as claimed in claim 3 wherein said other annular member is the inner member.

5. A preassembled support as claimed in claim 1 wherein said annular members are of L-shaped cross section and the connecting means comprises a plurality of openings in the flanges located at approximately the same diameter, one of said annular members being stationary and having additional openings for the attachment of a stationary brake part.

6. A wheel bearing unit for use in a vehicle according to claim 1, characterized in that the flanges of both structural members extend parallel radially outwardly, the flange of the inner member having a number of holes for the connection to the wheel and the flange of the outer member having holes for the connection to the vehicle at the same diameter and mutual spacing as the holes in the flange of the inner member as well as holes for the attachment of the stationary brake part, which holes have a different spacing.

* * * * *

UNITED STATES PATENT OFFICE
CERTIFICATE OF CORRECTION

Patent No. 3,757,883     Dated September 11, 1973

Inventor(s) Sture Lennart Asberg

It is certified that error appears in the above-identified patent and that said Letters Patent are hereby corrected as shown below:

On the cover sheet insert:

-- [30] Foreign Application Priority Data

February 5, 1970   Netherlands      70.01649 --.

Column 1, line 8, "dirven" should read -- driven --.

Column 4, line 32, after "connecting" insert -- the same to --

Signed and sealed this 19th day of November 1974.

(SEAL)
Attest:

McCOY M. GIBSON JR.           C. MARSHALL DANN
Attesting Officer             Commissioner of Patents